United States Patent [19]

Michel et al.

[11] Patent Number: 4,835,717
[45] Date of Patent: May 30, 1989

[54] INTELLIGENT LINE PRESSURE PROBE

[75] Inventors: Hilary Michel, Plainfield; Laurence S. Slocum, Indianapolis, both of Ind.

[73] Assignee: Emhart Industries, Inc., Indianapolis, Ind.

[21] Appl. No.: 134,694

[22] Filed: Dec. 18, 1987

[51] Int. Cl.[4] .......................... G06F 15/20; G01M 3/08
[52] U.S. Cl. ................................. 364/558; 73/40.5 R; 73/708; 73/756; 364/510; 364/556
[58] Field of Search .............. 364/509, 510, 558, 556; 73/1 H, 40, 40.5 R, 40.7, 700, 708, 302, 756; 222/52, 73; 137/458

[56] References Cited

U.S. PATENT DOCUMENTS

| | | | |
|---|---|---|---|
| 4,468,968 | 9/1984 | Kee | 73/708 |
| 4,567,773 | 2/1986 | Cooper | 73/708 |
| 4,575,807 | 3/1986 | Dodge | 364/558 |
| 4,644,482 | 2/1987 | Juanarena | 364/558 |
| 4,651,559 | 3/1987 | Horigome et al. | 73/40.5 R |
| 4,658,986 | 4/1987 | Freed et al. | 73/40.5 R |
| 4,715,214 | 12/1987 | Tveter et al. | 73/40 |
| 4,720,807 | 1/1988 | Ferran et al. | 364/558 |
| 4,727,748 | 3/1988 | Horigome et al. | 73/40 |

OTHER PUBLICATIONS

Universal Sensors & Devices, Inc., Bulletin No. LR-8601 entitled "LR1000 Leak Rater".
EMCO/Wheaton Brochure dated 10/85 and entitled "Line Leak Detector".
K&E Associates, Inc. Brochure entitled "Petroleum Monitoring System . . . PMS 810".
K&E Associates, Inc. Brochure entitled "Petroleum Monitoring System . . . PMS 800".

Primary Examiner—Parshotam S. Lall
Assistant Examiner—Kevin J. Teska
Attorney, Agent, or Firm—Carl A. Forest

[57] ABSTRACT

A pressure transducer, a microprocessor, and associated electronics are enclosed in a probe housing which may be attached to a liquid conduit with the pressure transducer responsive to the pressure of the liquid in the conduit to provide an electrical signal representative of the pressure. A temperature sensor is mounted in a cavity in the base of the housing to provide an electrical signal representative of the temperature of the liquid in the conduit. Decision criteria related to conditions of the liquid storage and dispensing system to which the probe is attached are stored in the microprocessor memory. The microprocessor logic processes the electrical signals using the stored decision criteria and provides a signal indicative of conditions in the storage and dispensing system. The probe automatically disregards temporary pressure drops due to harmless common procedures, disregards or compensates for pressure drops due to changes in temperature, and permits the pump serving the conduit to be temporarily turned on to test for leaks after repairs but prevents the pump from being activated for significant periods when leaks are present.

7 Claims, 6 Drawing Sheets

INTELLIGENT LINE PRESSURE PROBE

BACKGROUND OF THE INVENTION

1. Field of the Invention

The invention in general relates to line pressure probes that are used in line leak detector systems, and more particularly with such a pressure probe which is capable of analyzing the pressure data to provide a pressure signal that is more reliably representative of a link leak than the pressure signals provided by prior art pressure probes.

2. Description of the Prior Art

Line pressure probes have been widely used in the petroleum industry for many years. The line pressure probes generally report on the line pressure to a central monitor which utilizes the pressure data to provide warning of line leaks and to shut down pumps on lines that are leaking. Such pressure probes have become an essential part of a hydrocarbon storage and dispensing facilities since even very small leaks can result in the loss of thousands of dollars of hydrocarbon, and because spills from leaks have become highly regulated and expenses of cleanup can be enormous.

Up to now most line pressure probes have consisted of line pressure switches which provide a signal if line pressure falls below a certain value, for example, 5 psi. These probes are susceptible to providing an erroneous leak indication when the pressure drop is due to temperature contraction. More recently line pressure probes which provide a continuous pressure reading and also provide the ground temperature have been available. Such probes allow the central monitor to analyze the pressure and temperature data to provide a more reliable indication of whether a leak has occurred. However, many such probes can overwhelm a central monitor with data so that it is slow in responding to leaks, which can be a serious disadvantage that can result in large spills that occur when pumps are not shut down immediately when catastrophic damage occurs in a hydrocarbon storage and dispensing system.

Since the line leak detectors turn off the pumps, repairing pipes on testing repairs for leaks can be difficult unless the system is turned off. Some systems provide a manual reset switch on the central monitor to avoid such problems. However, such resets apply to all probes in the system and can be misused by attendants who reset the system either unintentionally or intentionally when leaks are present.

SUMMARY OF THE INVENTION

It is an object of the invention to provide a line pressure probe that overcomes one or more disadvantages of the prior art line pressure probes.

It is another object of the invention to provide a line pressure probe that provides a line pressure signal that can be reliably used by a central monitor, without further analysis, to turn off pumps.

It is a further object of the invention to provide a line pressure probe that automatically disregards temporary pressure drops caused by common harmless procedures at fuel dispensing facilities, such as when an operator opens a fuel dispensing valve before turning on the pump.

It is a further object of the invention to provide a line pressure probe that automatically disregards or compensates for pressure drops due to changes in temperature of the liquid in the line.

It is yet another object of the invention to provide a line pressure probe that permits the pump serving the line to be temporarily turned on to test for leaks after repairs, but at the same time prevents the pump from being activated for significant periods of time when leaks are present.

It is a further object of the invention to provide a line pressure probe that is compact and rugged.

The invention provides a line pressure probe for use in a liquid storage and dispensing system, the probe comprising: pressure transducer means for providing an electrical signal representative of the pressure in a liquid conduit; digital storage means for storing a plurality of decision criteria related to conditions of the liquid storage and dispensing system and the pressure in the conduit; digital logic means responsive to the pressure signal and communicating with the storage means for providing an output signal indicative of one or more conditions of the storage and dispensing system; probe housing means for enclosing the pressure transducer means, the storage means and the logic means, the housing means including a means for attaching the housing to a liquid conduit with the pressure transducer responsive to the pressure of the liquid in the conduit. Preferably the line pressure probe further comprises manually operated means for changing the output signal for a first predetermined time. Preferably the probe also comprises means for preventing the output signal from being changed more than a predetermined number of times over a second predetermined time. Preferably the manually operated means comprises: timing means for producing a timing signal; first counter means responsive to the timing signal for counting a first predetermined time; manually operated switch means for resetting the first counter means; and means communicating with the first counter means for setting the output signal to a predetermined output signal for the predetermined time; and wherein the means for preventing comprises: second counter means responsive to the timing signal for counting a second predetermined time; third counter means for counting the number of times the first counter means has been reset; and means responsive to the second counter means and the third counter means for preventing the first counter means from being reset more than the predetermined number of times during the second predetermined time. Preferably the pressure probe further comprises means for delaying the providing of a predetermined output for a predetermined time. Preferably the predetermined output comprises an output signal indicative of a leak in the conduit and the means for delaying comprises means for delaying the output of the leak signal for a time sufficient for a person to turn on a gasoline pump after opening the valve on a gasoline dispenser hose. Preferably the line pressure probe comprises temperature sensing means enclosed within the housing for providing an electrical signal representative of the temperature of the liquid in the conduit; the digital storage means further comprises means for storing decision criteria related to the temperature of the liquid; and the digital logic means comprises logic means responsive to the pressure and temperature signals and communicating with the storage means for providing an output signal indicative of one or more conditions of the storage and dispensing system.

The line pressure probe according to the invention provides more sophisticated and reliable response to line pressure drops than whole systems (including the central monitors) of prior art leak detection systems and yet is more compact than the probes of the prior art systems. Numerous other features, objects and advantages of the invention will become apparent from the following detailed description when read in conjunction with the accompanying drawings.

DESCRIPTION OF THE PREFERRED EMBODIMENT

Figure 1:
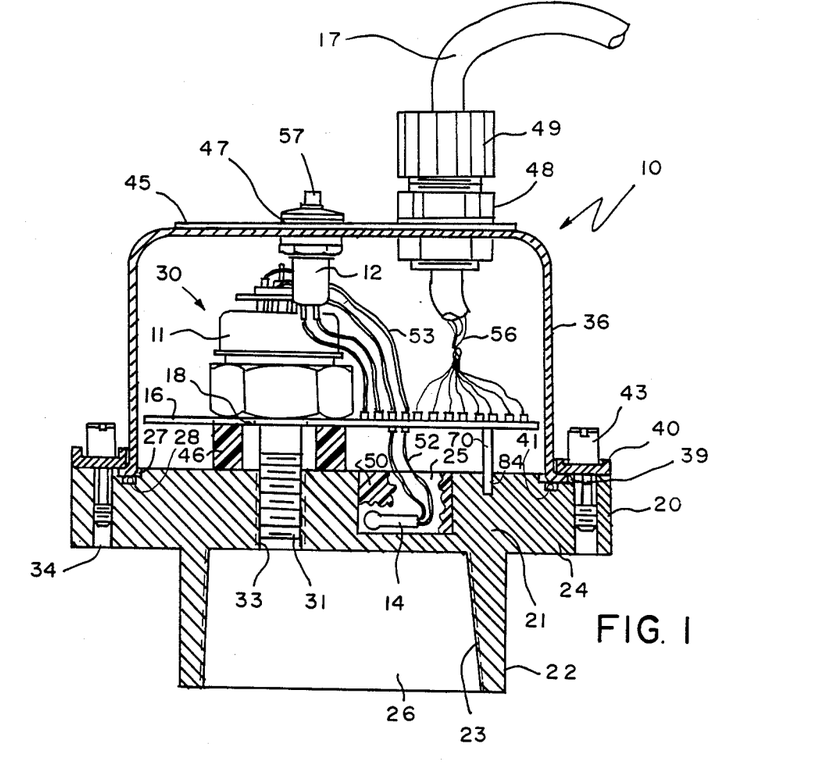
FIG. 1 is a cross-section of the preferred embodiment of a line pressure probe according to the invention.
Figure 2:
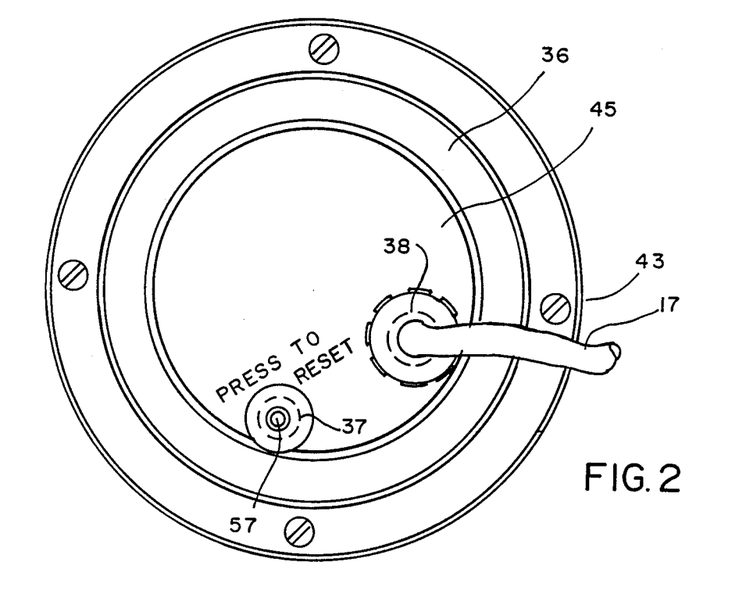
FIG. 2 is a top plane view of the line pressure probe of FIG. 1.

Directing attention to FIGS. 1 and 2, the preferred embodiment of a line pressure probe 10 according to the invention is shown. A pressure transducer 11, a reset switch 12 and a temperature sensor 14 are connected to a circuit board 16 containing a microprocessor 60 (FIG. 3A), all of which are enclosed in a housing 20 which may be screwed on to a pipe T (not shown) via threaded extension 22. With the housing in place on the pipe, the liquid in the pipe can fill the interior 26 of extension 22 and pass through tube 31 to contact the transducer element within pressure transducer 11. Housing base 21 is preferably made of aluminum or other metal which conducts heat easily so that temperature sensor 14 in bore 25 in base 21 follows the temperature of the liquid in the pipe. The outputs of pressure transducer 11, temperature sensor 14 and switch 12 are applied to the microprocessor 60 (FIG. 3A) on the circuit board 16 which processes them to provide an output signal over cable 17 indicative of the conditions of the liquid storage and dispensing system (not shown) to which the probe 10 is attached.

Turning now to a more detailed description of the preferred embodiment, pressure transducer means 30 for providing an electrical signal representative of the pressure in a liquid conduit (referred to as a pressure signal for short) comprises pressure transducer 11, having a threaded cylindrical tube 31, and associated electronics on circuit board 16 which shall be discussed in connection with FIG. 3B. Housing 20 comprises: base 21 which includes disc-shaped plate 24 having circular grooves 27 and 28, cylindrical bore 25 and cylindrical threaded bores 25, 33 and 34 (four of the latter); cup-shaped cover 36 having circular holes 37 and 38 (FIG. 2) and circular flange 39; cylindrical base 22; retaining ring 40; o-ring 41; bolts 43; and label 45. Other components include transducer gasket 46, o-ring connectors 47 and 48, connector 49 and pin 51.

The probe is assembled by inserting temperature sensor 14 in bore 25 and filling the bore 25 with thermal conductive adhesive 50, then inserting pressure transducer 11 through a circular hole 18 in circuit board 16 and through gasket 46 with the gasket between the board 16 and plate 24, inserting pin 70 through a hole in circuit board 16 and into bore 84 and screwing the transducer tube 31 into threaded bore 33 to firmly hold and support the circuit board above the plate 24. Pin 70 prevents circuit board 16 from rotating when transducer 11 is tightened. Label 45 is applied to cover 36, then switch 12 is mounted to cover 36 with connector 47 which is provided with the switch and cable 17 is mounted to the cover 36 with connectors 48 and 49; o-ring 41 is placed in groove 28 and cover 36 is placed over the electronics with flange 39 in groove 27 and retainer 40 is placed over the flange 39 and bolts 43 are screwed into bores 34 to hold the retainer 40 and cover 36 in place. Wires such as 52, 53 and 56 are attached to circuit board 16 during the above operations at appropriate stages to facilitate the assembly. Epoxy sealant may be applied to tube 31 and RTV silicon adhesive may be applied to connector 48 before assembly.

Figure 3A:
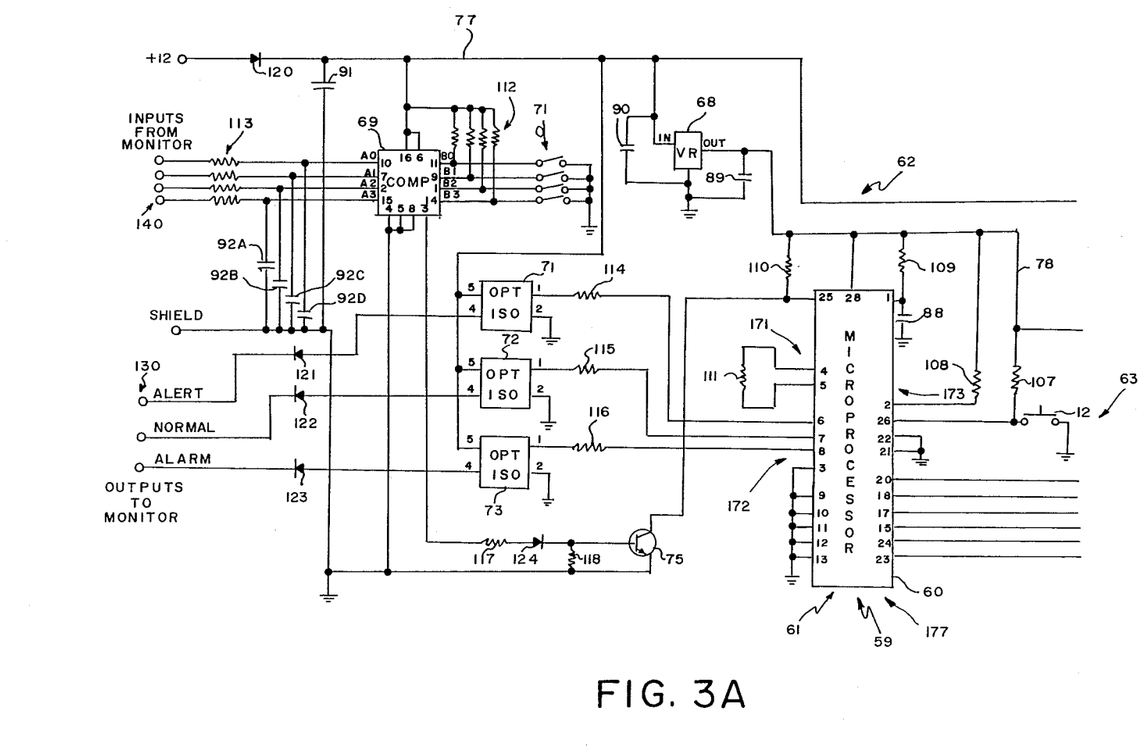
FIGS. 3A and 3B show an electronic circuit diagram of the line pressure probe of FIG. 1.
Figure 3B:
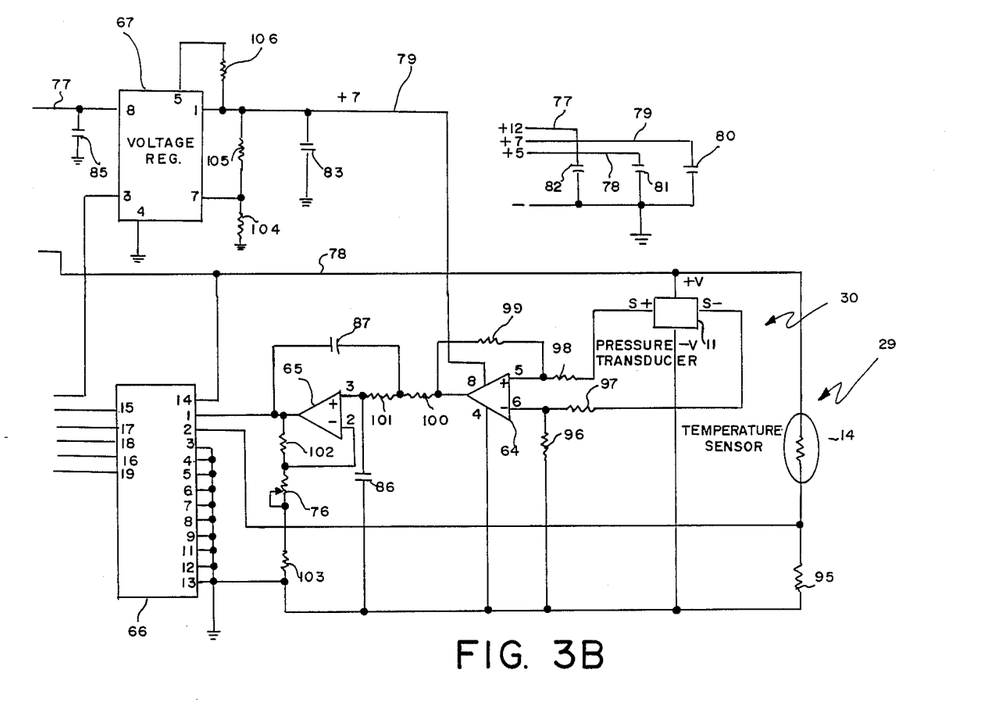
Figure 3C:
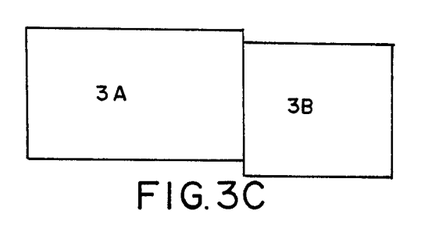
FIG. 3C shows the arrangement of FIGS. 3A and 3B from which the electrical connections between the FIGS. will be clear.

Turning now to FIGS. 3A, 3B, and 3C a detailed electrical circuit diagram of the preferred embodiment of the invention is shown. If FIGS. 3A and 3B are placed together as shown in FIG. 3C, the electrical connections between the two portions of the circuit will be clear. The circuit includes a digital storage means 61, comprising the memory located within microprocessor 60, for storing a plurality of decision criteria related to conditions of the liquid storage and dispensing system and the pressure in the conduit to which probe 10 is attached; it also includes a digital logic means 62, comprising the processor portion of the microprocessor 60 and the rest of the electronic circuitry shown in FIG. 3A, which logic means is responsive to the pressure and temperature signals input on its pins 18, 17, 15, 24 and 23 and communicating with the storage means 61 for providing an output signal indicative of one or more conditions of the liquid storage and dispensing system. The circuit also includes pressure transducer means 30 comprising transducer 11, op amps 64 and 65, and their associated resistors and capacitors and temperature transducer means 29 comprising temperature sensor 14 and resistor 95. In addition to microprocessor 60, the electrical circuit components include pressure transducer 11, temperature sensor 14, operational amplifiers 64 and 65, A to D converter 66, voltage regulators 67 and 68, 4-bit comparator 69, switch 12, DIP switches 71, optoisolators 71, 72 and 73, transistor 75, variable resistor 76, capacitors 80-83 and 85-91 and 92A-92D, resistors 95-118, and diodes 120-124. The +V side of pressure transducer 11 is connected to the +5 volt power supply while the −V side is connected to ground. Its positive output S+ is connected to the positive input of operational amplifier 64 through resistor 98 while its negative output −S is connected to the negative input of operational amplifier 64 through resistor 97. One side of temperature sensor 14 is connected to the +5V power supply line while the other side is connected to ground through resistor 95 and to the number 2 pin of A to D converter 66. (The numbers near the input and output lines of the integrated circuits, such as the "5" near the positive input of op amp 64 and "14" at the top-right of A to D converter 66, refer to the pin numbers of the IC's.) The number 5 pin of op amp 64 is also connected to its output through resistor 99 while the number 6 pin (negative input) is connected to ground through resistor 96. The number 8 pin of op amp 64 is connected to the number 1 pin of voltage regulator 67, which is the +7 volt output, and the number 4 pin of op amp 64 is connected to ground. The output of op amp 64 is connected to the positive input of op amp 65 through resistors 100 and 101. The line between resistors 101 and 100 is connected to the output of op amp 65 through capacitor 87. The positive input (number 3 pin) of op amp 65 is also connected to ground through capacitor 86. The negative input (number 2 pin) is connected to the output through resistor 102 and also to ground through variable resistor 76 and resistor 103. The number 8 pin of voltage regulator 67 is connected to the +12 volt power supply line 77 and to ground through capacitor 85. The number 3 pin of voltage regulator 67 is connected to the number 20 pin of microprocessor 60, the number 4 pin is grounded, the number 5 pin is connected to the number 1 pin through resistor 106, and the number 7 pin is connected to the number one pin through resistor 105 and to ground through resistor 104. The number 1 pin is also connected to ground through capacitor 83. The circuit at the upper right of FIG. 3B is the bypass capacitor circuit. As indicated, the +12 volt line 77 is connected to ground through capacitor 82, the +7 volt line 79 is connected to ground through capacitor 80, and the +5 volt line 78 to ground through capacitor 81. The number 3 through 13 pins of A to D converter 66 are grounded. The number 15, 17, 18, 16 and 19 pins of A to D converter 66 are connected to the number 18, 17, 15, 24, and 23 pins respectively of microprocessor 60. The number 26 pin of microprocessor 60 is connected to the +5 Volt power line 78 through resistor 107 and to one side of switch 12. The other side of switch 12 is connected to ground. Pin 2 of microprocessor 60 is connected to the +5 volt power line 78 through resistor 108; pin number 1 is connected to the same power line through resistor 109 and to ground through capacitor 88. Pin 28 is connected directly to the +5 V power line 78; pin 25 is connected to the +5 V power line 78 through resistor 110 and also to the collector of transistor 75. Pins 4 and 5 are connected through resistor 111, and pins 3, 9–13, and 21 and 22 are grounded. Pins 6, 7 and 8 of microprocessor 60 are each connected to the number 1 pin of optoisolators 71, 72 and 73 respectively through resistors 114, 115 and 116 respectively. The input terminal of voltage regulator 68 is connected to the +12 volt power line 77 and to ground through capacitor 90. The ground of voltage regulator 68 is connected to ground. The output of voltage regulator 68 is connected to ground through capacitor 89 and also provides the +5 volt power source. The number 2 pin of each of optocouplers 71, 72 and 73 is grounded, their number 5 pins are connected to the +12 volt power line 77 and their number 4 pins provide the Leak Alert, System Normal, and Leak Alarm outputs respectively to the central monitor through diodes 121, 122 and 123 respectively with the anode of the diode toward the optoisolators. The nubmer 11, 9, 1 and 14 pins of comparator 69 are each connected to the +12 V power line 77 through one of resistors 112 and to one side of each of switches 71 respectively. The other side of each of the switches 71 is connected to ground. The numbers 16 and 6 pins of comparator 69 are connected to the +12 volt power line while the number 4, 5 and 8 pins are grounded. The number 3 pin is connected to the base of the transistor 75 through resistor 117 and diode 124 in series with the cathode of the diode toward the transistor. The base of transistor 75 is also connected to ground through resistor 118. The emitter of the transistor is connected to ground. Pins 10, 7, 2 and 15 of comparator 69 are each connected to ground through capacitors 92A–92D respectively and are also connected to the digital inputs from the central monitor through one of resistors 113 respectively. The 12 volt power line 77 is connected to the 12.6 volt input from the central monitor through diode 120, with the anode of the diode toward the input, and also to ground through capacitor 91.

In the preferred embodiment, base 21 is made of aluminum. Cover 36, retainer 40, bolts 43, tube 31 and adapter 32 are made of stainless steel, gasket 46 is made of Nitrile TM rubber and o-ring 41 is made of Viton TM plastic pin 84 is made of suitable plastic, adhesive 50 is preferably Output Thermally Conductive Adhesive made by Loctite Electronics Division, 705 North Mountain Road, Newington, Connecticut 66111, label 45 is mylar backed with pressure-sensitive adhesive, connectors 48 and 49 are sold as a single unit; i.e. the Hubbell TM ⅜ FO cable pass-through connectors, and cable 17 is an eight-wire-plus-drain wire (shield) cable. Pressure transducer 11 is preferably a Foxbore TM type 1221-07-G-K-4-L and the temperature sensor 14 is preferably an Amperex TM type KTY81-110 silicon temperature sensor. Preferably the other electrical components are as follows: microprocessor 60 is a type MC1468705CS, A to D converter 66 is an MC145041P2, operational amplifiers 64 and 65 are part of a LM2904 IC, voltage regulator 67 is a type LP2951ACN variable voltage regulator, voltage regulator 68 is a type LP2950 fixed voltage regulator, comparator 69 is a type 74C85 4-bit comparator, switch 12 is a model P7-331222 made by Otto Engineering, Inc., 2 East Main Street, Carpentersville, IL 60110, switch 71 is a 4-circuit DIP switch, optoisolators 71, 72 and 73 are each a type MOC8021, transistor 75 is a type 2N2222A, variable resistor 76 is a 2K ohm variable resistor, capacitors 80, 81, 82, 85, 90, 91 and 92A–92D are 0.1 microfarad, capacitor 83 is a 0.33 microfarad capacitor while 88 and 89 are 1 microfarad, and 86 and 87 are 0.47 microfarad capacitors, resistors 106, 109 and each of resistors 112 are 100K ohm. Resistors 102, 107 and 108, are 10K ohm, resistors 97, 98, 117 and 118 are 47K ohm, resistors 114, 115 and 116 and 95 are 3.3K ohm, resistors 100 and 101 are 68K ohm, each of resistors 113 are 15K ohm, and resistors 96, 103, 104, 105, 110 and 111 are 2.2 megohm, 8.2K ohm, 100K ohm, 470Kohm, 22K ohm and 39.2K ohm respectively. Diode 124 is a type IN 914, and diodes 120, 121, 122 and 123 are type IN4001's.

The line pressure probe according to the invention operates on the principle that liquids are highly incompressible so that when the liquid is pressurized in a container and a leak develops in the container the pressure will drop drastically when only a small amount of the liquid is lost through the leak.

One of the unique features of the probe according to the invention is the use of a pressure transducer as opposed to a pressure switch that is used by prior art devices to determine if the pressure has dropped below a certain level. The pressure transducer allows for multiple pressure detects points that can be used to indicate different conditions in the liquid storage system line as well as easy adjustment of the pressure set points to fit different needs. Or the rate of change in pressure can be used to determine line conditions.

The invention operates as follows. Pressure transducer 11 is responsive to the pressure of the liquid in a conduit of the liquid storage and dispensing system. In the preferred pressure transducer, liquid from the conduit passes through bore 33 and tube 31 and enters the transducer 11 where it presses on a metal diaphragm which acts against a piezoelectric crystal to produce an electrical signal representative of the pressure. The preferred pressure transducer 11 is internally temperature compensated. The temperature compensation provides for more accurate readings of pressure over varying temperatures and thus minimizes false triggering due to low temperatures. The pressure transducer is energizing by the 5 volt power line 78. The transducer outputs +s and −s are differentially amplified by op amp 64 followed by a low pass filter comprising op amp 65 and its associated resistor and capacitors with a cut-off frequency of 5 hz a roll-off of 12db per octave and a gain of 2. The low pass filter is used to filter any noise in the signal but especially 60 hz ac noise. Variable resistor 96 is used to calibrate the pressure transducer means 30. Preferably the variable resistor is set so that the maximum input on pin number 1 of A to D converter 66 is 5 volts. Silicon temperature sensor 14 and resistor 95 comprise a temperature sensing means 29 for providing an electrical signal representative of the temperature of the liquid in the storage and dispensing system line (referred to as a temperature signal for short) to which the probe 10 is attached. A to D converter 66 converts the outputs of the pressure tranducer means 30 and temperature sensing means 29 into two digital binary numbers: a number from 0 to 255 corresponding to a pressure from 0 to 30 psi and another number from 83 to 103 corresponding to a temperature from −40 to 50 degrees centigrade. These numbers are provided to the microprocessor 60 when it requests them.

The digital logic means 62 responds to the pressure and temperature signals from A to D converter 66 to provide the probe output signal on outputs 130 in the following manner. When comparator 69 detects a 4-bit number on the A0 through A3 inputs matching the 4-bit number on the B0 through B3 inputs which are set by the DIP switches, it outputs a logic 1 on pin 3 which turns on transistor 75. This places a logic state of 0 on pin 25 of microprocessor 60. When comparator 69 detects a 4-bit number on the "A" inputs which does not match the 4-bit number on the "B" inputs, it outputs a logic 0 on pin 3 turning off transistor 75 and placing a logic state of 1 on microprocessor 60, pin 25. Diode 124 is included in the switching circuit to bias the switching voltage in such a way as to allow reliable logic switching voltages to the microprocessor over the −40 to +50 degree centigrade range. The logic 0 at pin 25 is a request by the central monitor unit for the pressure probe to send its output signal.

Figure 4:
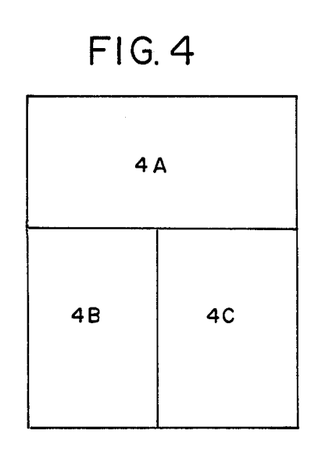
FIG. 4 shows the arrangement of FIGS. 4A, 4B and 4C from which the interconnection of the flow paths of the FIGS. will be clear.
Figure 4A:
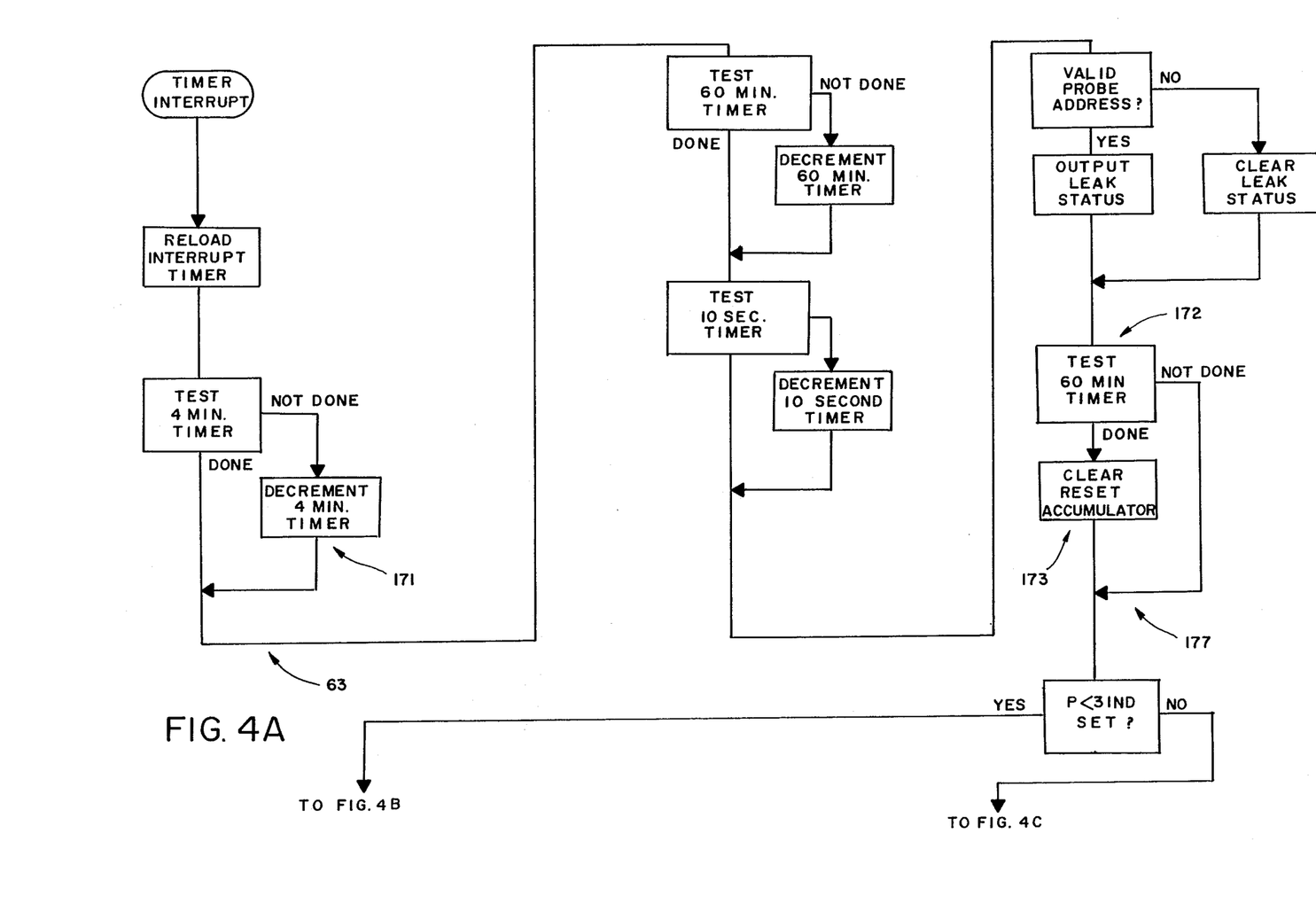
FIGS. 4A, 4B and 4C show a flow chart of the preferred embodiment of the line pressure probe software program according to the invention.
Figure 4B:
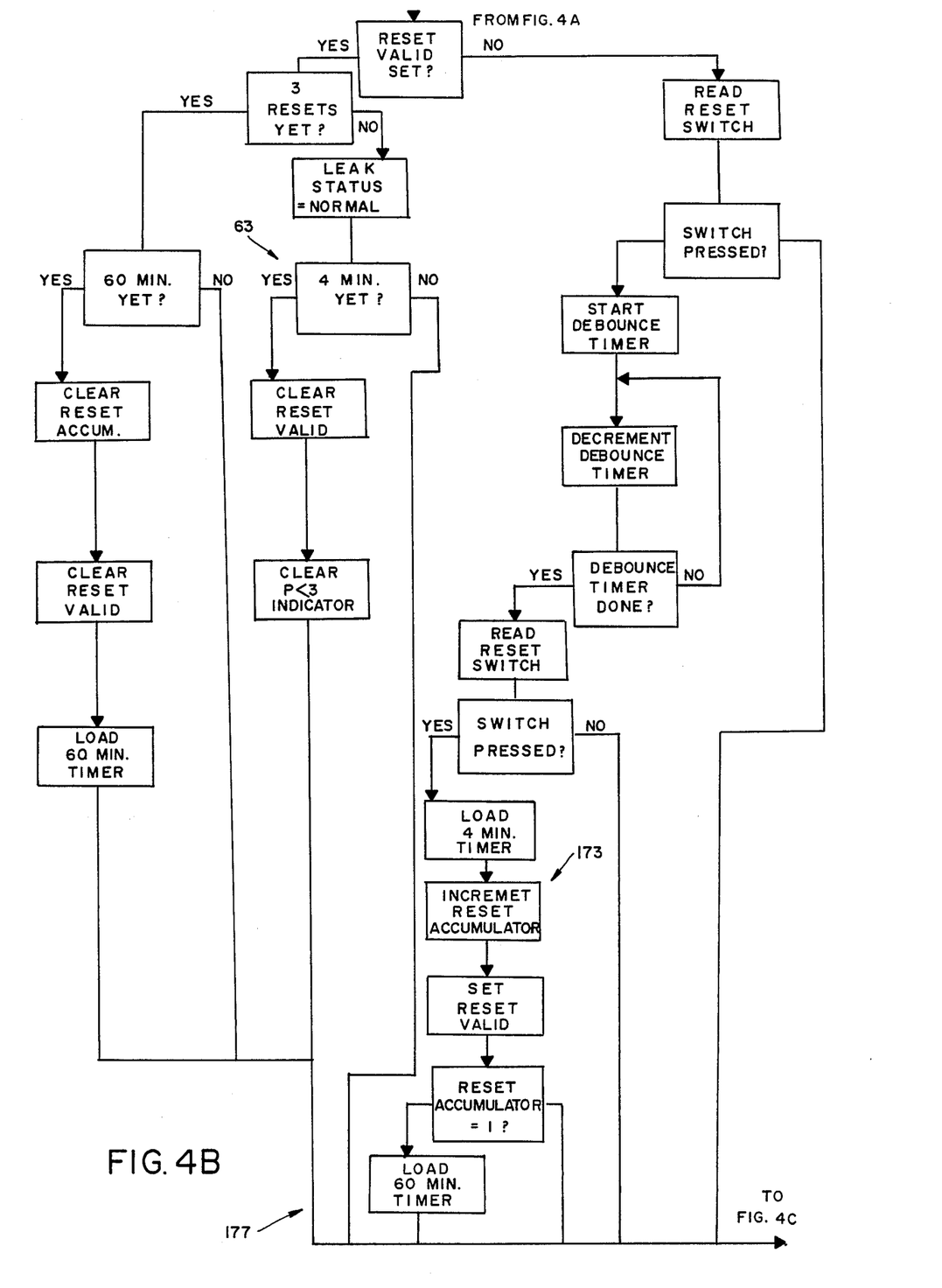
Figure 4C:
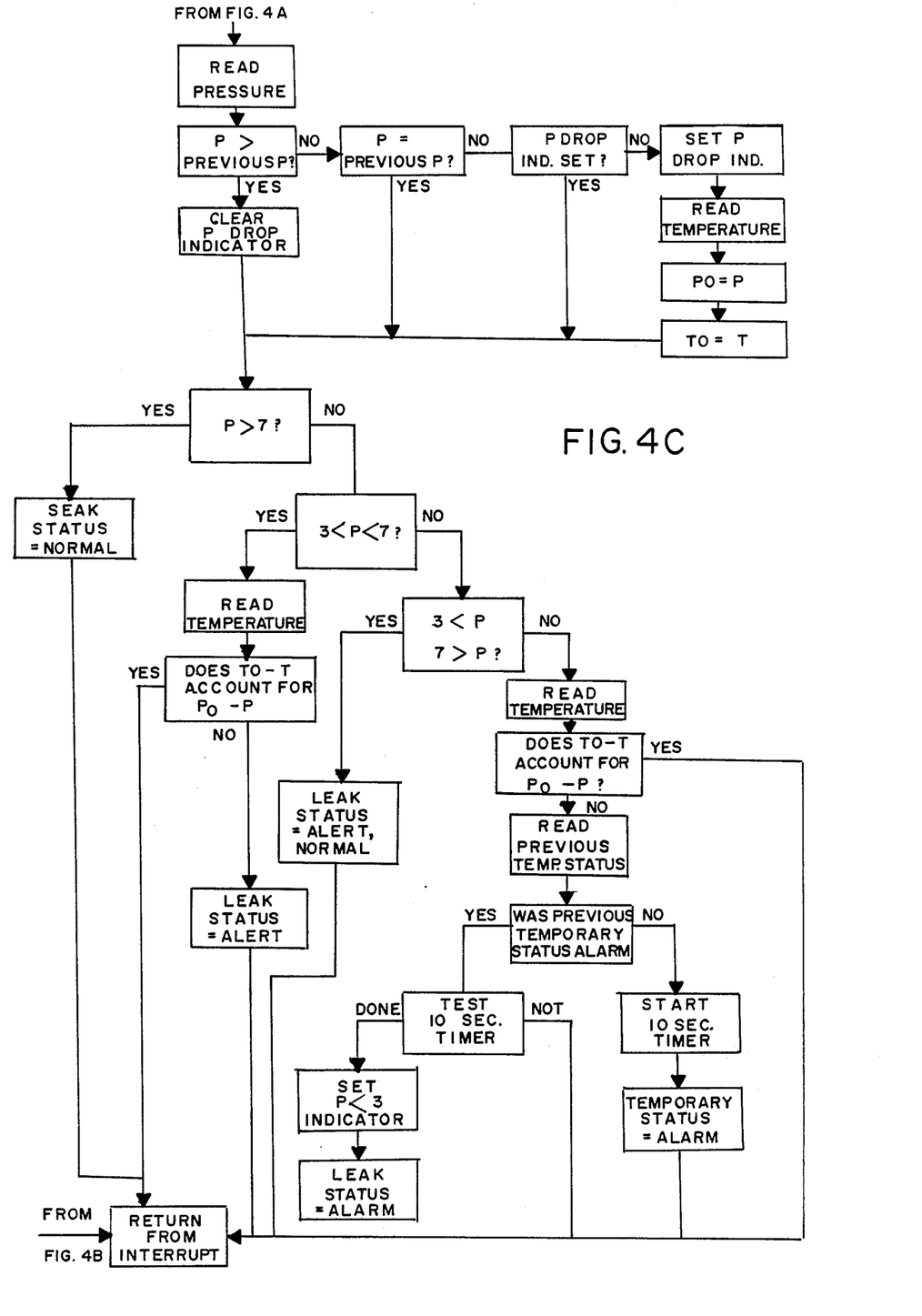

The preferred operation of the microprocessor 60 to provide the output signal is depicted in the flow chart of FIGS. 4A, 4B and 4C. FIG. 4 indicates how FIGS. 4A, 4B and 4C should be placed together to show the complete flow chart. It should be understood that this flow chart describes the preferred operations of the microprocessor to provide the output; using other sets of operations are possible, some simpler, some more complex, and thus the operations should be seen as exemplary and not limiting of the invention. In the preferred embodiment, normally microprocessor 60 operates in a wait state mode to allow for lower power consumption. At 0.10 second intervals, it is interrupted by an internal hardware timer and proceeds with its timing, testing and output functions. At such time that those functions are completed it returns to the wait state to wait for another interrupt. On interrupt, microprocessor 60 reloads the hardware interrupt timer to allow for the next 0.10 second interrupt. It then tests a 4 minute timer and if the timer is not done counting, it decrements it. Likewise it tests and increments a 60 minute and a ten second timer. These timers are utilized as shall be described below. After the timers are decremented, the microprocessor 60 checks the signal on its pin 25 and if it is logic 0, then it recognizes that the comparator 69 has received a valid probe address from the monitor and it outputs the leak status detected by the probe. This leaks status will be the leak status determined on the previous interrupt, as described below, and will be one of the following four conditions: (1) if the pressure is above 7 psi, or if the pressure is below 7 psi but this is accounted for by a temperature drop in the liquid, then microprocessor 60 will output a logic 0 on pins 6 and 8 and a logic 1 pin 7 which is the condition "normal" output; (2) if the pressure is between 3 psi and 7 psi, and the pressure drop cannot be accounted for by a temperature drop in the liquid, then microprocessor 60 will output a logic 1 on pin 6 and a logic 0 on pins 7 and 8, which is the condition "Alert" output; (3) if the pressure is below 3 psi and the low pressure cannot be accounted for by a temperature drop, then the microprocessor 60 outputs a logic 0 on pins 6 and 7 and a logic 1 on pin 8 which is the "Alarm" output; (4) if the microprocessor during its maintenance test routine discovers a failure in the electronic circuitry that could result in an erroneous output, then a logic 1 is placed on pins 6 and 7 and a logic 0 is placed on pin 8 which is the "Error" output. The outputs of pins 6, 7 and 8 of microprocessor 60 drive optoisolators 71, 72 and 73 respectively. These optoisolators are high current gain couplers that amplify the signal of microprocessor 60 sufficiently to drive the opto-couplers on the inputs of the central monitor (not shown). If the probe is not being addressed by the central monitor, the leak status is cleared by setting pins 6, 7 and 8 low (logic 0) to prevent data from multiple probes from occurring simultaneously on the data lines.

On the first pass through the flow chart after startup of the probe and on subsequent passes until the pressure drops to less than 3 psi, the microprocessor will test the 60 minute timer, clear the reset accumulator and pass to FIG. 4C since P less than 3 indicator will not be set. If the pressure has dropped since the previous interrupt, the temperature will be read and a base pressure Po, and a base temperature To, will be set equal to the current pressure and temperature respectively. Thereafter, unless the pressure rises, the routine will bypass the routine which sets To and Po, and thus these values will remain latched in memory. If P is greater than 7 psi, the leak status Normal condition will be stored in memory. If the pressure is between 3 psi and 7 psi and the pressure drop is not accounted for by a corresponding temperature drop, then (see below) a leak status Alert condition is stored in memory. This condition denotes that the pressure has dropped enough to indicate the possibility of a leak or a small leak, but not enough to declare a leak Alarm condition. If the pressure falls below 3 psi, then a 10 second timer starts and an Alarm indication is stored in a special location in memory labeled as "temporary". If after ten seconds the pressure is still below 3 psi, then the probe will no longer test the pressure and the Alarm condition will be latched into memory until such time that the probe reset switch is pressed (See FIG. 4B). The 10 second timer allows for the situation where a customer at a service station opens the valve in the handle of the dispenser hose before the dispenser pump is turned on. That action would drop the pressure to zero yet a leak condition would not exist. The 10 seconds provides sufficient time for the customer to realize the gasoline is not flowing and to activate the pump.

The manually operated means 63 for changing the output signal from one indication to another indication for a first predetermined time preferably comprises the reset switch 12, the four minute timer, and the portion of the software in the central and upper right hand portions of FIG. 4B relating to the four minute timer. The means 177 for preventing the output signal from being changed from the one indication for more than a predetermined number of times over a second predetermined time comprises the 60 minute timer and reset accumulator and that portion of the software in the lower center and left hand portions of FIG. 4B and lower right portion of FIG. 4A relating to the 60 minute timer and the reset accumulator. The manually operated means 63 includes first counter means 171, which preferably comprises the software counter portion of the four minute timer. The means for preventing comprises a second counter means 172 and third counter means 173. The second counter means 172 comprises the 60 minute timer, while the third counter means 173 comprises the reset accumulator. The timing means 59 for producing a timing signal comprises an internal crystal in the microprocessor 60 and resistor 111. Continuing with the discussion of the flow chart, once the 10 second timer expires after a P<3 reading, then the P<3 indicator is set and the flow goes to FIG. 4B rather than FIG. 4C. This will effectively latch the Alarm condition in memory until the reset switch 12 is actuated by pressing button 57. The flow in FIG. 4A at first will go to the right since the Reset Valid flag is not set. The microprocessor reads the reset switch and if it is not pressed, the interrupt routine is exited. When the switch is pressed the flow passes through a debounce routine to make sure the switch is pressed and then loads the four minute timer, increments the reset accumulator, sets the Reset Valid flag and loads the 60 minute timer. For the next four minutes, the software will flow through center portion of FIG. 4A, which changes the leak status from one indication (Alarm) to another indication (Normal) and then exits the interrupt routine. After four minutes, the Reset Valid flag and the P<3 flags are cleared and the flow again goes through FIG. 4C until an alarm condition is latched, whereupon it returns through the right hand side of FIG. 4B until the reset is pressed, and repeats for another four minutes to set the leak status indication to Normal, until 3 resets have been accumulated. At this point, the flow goes to the left in FIG. 4B and if the 60 minute clock has not expired, the alarm condition will remain latched despite the pressing of the reset switch. After 60 minutes the Reset Accumulator and the Reset Valid flag will be cleared and the reset switch will once again be read and the cycle repeated. The 4-minute timing function allows the pump to be energized to repressurize the line. This allows a service person to restart the probe after a line leak has been repaired. Otherwise there would be no method to restart the probe since when the reset switch was pressed the probe would immediately read the pressure which would still be below psi. To prevent misuse of the reset switch, the 60 minute timer function prevents the switch from being actuated more than 3 times in a 60 minute period from the first actuation. If the switch was only pressed once or twice in a 60 minute time period, the software at the bottom of FIG. 4A will clear the register than contains the number of switch actuations after 60 minutes has elapsed from the first actuation. Then on the next switch actuation the 60-minute timer will restart. In the above discussion the software asks in several places if the $T_o$-T measurement accounts for the $P_o$-P difference. In the preferred embodiment this decision is made by referring to a matrix of $T_o$-T values vs. acceptable $P_o$-P values in memory. The matrix is preferably determined from the following analysis. If there is no leakage of liquid and assuming pressure changes in the range of from zero to thirty psi, the relatively small temperature changes associated with in-ground tanks, no air or vapor in the lines and that the conduits are rigid, the mass of liquid in the line will be constant and the volume of liquid may be considered to change in only two ways; i.e., by varying the pressure with the temperature held constant and by varying the temperature with the pressure held constant. The total density change will be $$d\rho = \frac{\partial \rho}{\partial T}\bigg|_P dT + \frac{\partial \rho}{\partial P}\bigg|_T dP.$$

The coefficient of thermal expansion, $\alpha$, of a substance is generally defined by the equation $\Delta\Sigma = -\alpha\rho_o\Delta T$. Thus, in terms of differentials, $$\frac{\partial \rho}{\partial T}\bigg|_P = -\rho_o \alpha.$$

This isentropic bulk modules, K, of a substance is generally defined by the equation $$\Delta\rho = \frac{1}{K}\rho\Delta P.$$

Thus, in terms of differentials, $$\frac{\partial \rho}{\partial P}\bigg|_T = \rho/K \text{ and therefore } d\rho = -\rho_o\alpha dT + \frac{\rho}{K}dP.$$

If there is no loss of mass and the volume of the conduit is constant, then $d\rho=0$ and $\rho=\rho_o$. Therefore, $$\alpha dT = \frac{1}{K}dP \text{ or } P_o - P = \alpha K(T_o - T).$$

This equation is preferably used to generate the matrix of $T_o$-T vs. $P_o$-P values from the experimentally determined coefficient of thermal expansion, $\alpha$, and bulk modulus, K, which depend on the particular liquid stored in the system, and are generally available for common liquids. Interpolation is preferably used to determine values between the values in the matrix. If the $P_o$-P value measured is within the range of the $P_o$-P values assigned to the $T_o$-T value found, then the system exits the interrupt routine. The matrix may be programmed into the microprocessor chip at the installation site using a programmer provided by the manufacturer (Motorola) or alternatively, the installer may have available a variety of pre-programmed chips corresponding to various conduit volumes and insert the appropriate chip at installation. It is a feature of the invention that the software described above permits a wide variety of other criteria to be employed to determine if To-T accounts for Po-P. For example, a software clock may be inserted in FIG. 4C in the subroutine at the upper right in which Po and To are set. This clock would be reset each time Po and To are set and the time it shows when Po-P and To-T are determined may be used to calculate a rate of change of pressure and temperature, which may be used to determine if an alarm condition should be indicated.

It is a feature of the invention that the line pressure probe provides numerous automatic functions that have never been provided by prior art pressure probes. Yet the probes are more compact than prior art probes. Numerous elements combine to provide these features. The microprocessor 60 and its novel programming are important features, of course. The pressure and temperature transducer and their physical arrangement are also important. Equally important are the aluminum and stainless steel housing, the manner of sealing the housing and the manner of mounting the electronics in the housing to produce a rugged compact probe containing sophisticated electronics, which are susceptible to damage by moisture and other fluids, all of which can operate reliably in an underground environment which is likely to contain ground water and other liquids such as gasoline and oil.

A novel line pressure probe that automatically responds to prevent false alarms when customers incorrectly operate the pump equipment, that allows for checking out equipment after repairs while still preventing extended operation during unsafe conditions and has numerous other features has been described. It is evident that those skilled in the art may now make numerous uses and modifications of and departures from the specific embodiments described herein without departing from the inventive concepts. For example, equivalent electronic components and other materials may be substituted. Additional features can be added. Many other variations can be made. The probe can employed in systems storing liquids other than gasoline. Consequently, the invention is to be construed as embracing each and every novel features and combination of features present in and/or possessed by the line pressure probe described.

What is claimed is:

1. A line pressure probe for use in a liquid storage and dispensing system, said probe comprising:
   pressure transducer means for providing an electrical signal representative of the pressure in a liquid conduit;
   digital storage means for storing a plurality of decision criteria related to conditions of said liquid storage and dispensing system and said pressure in said conduit;
   digital logic means responsive to said pressure signal and communicating with said storage means for providing an output signal indicative of one or more conditions of said liquid storage and dispensing system relative to said pressure signal; and
   probe housing means for enclosing said pressure transducer means, said storage means, and said logic means, said housing means including means for attaching said housing to a liquid conduit with said pressure transducer responsive to the pressure of the liquid in said conduit.

2. A line pressure probe as in claim 1 and further comprising manually operated means for changing said output signal for a first predetermined time.

3. A line pressure probe as in claim 2 and further comprising means for preventing said output signal from being changed more than a predetermined number of times over a second predetermined time.

4. A line pressure probe as in claim 3 wherein said manually operated means comprises:
   timing means for producing a timing signal;
   first counter means responsive to said timing signal for counting a first predetermined time;
   manually operated switch means for resetting said first counter means; and
   means communicating with said first counter means for setting said output signal to a predetermined output signal for said first predetermined time; and
   wherein said means for preventing comprises:
   second counter means responsive to said timing signal for counting a second predetermined time;
   third counter means for counting the number of times said first counter means has been reset; and
   means responsive to said second counter means and said third counter means for preventing said first counter means from being reset more than said predetermined number of times during said second predetermined time.

5. A line pressure probe as in claim 1 and further comprising means for delaying the providing of a predetermined output for a predetermine time.

6. A line pressure probe as in claim 5 wherein said predetermined output comprises an output signal indicative of a leak in said conduit and said means for delaying comprises means for delaying the output of said leak signal for a time sufficient for a person to realize that the liquid is not being dispensed and to turn on a liquid pump after opening the valve on a liquid dispensing hose.

7. A line pressure probe as in claim 1 and further comprising temperature sensing means enclosed within said housing for providing an electrical signal representative of the temperature of the liquid in said conduit and wherein:
   said digital storage means further comprises means for storing decision criteria related to the temperature of said liquid; and
   said digital logic means comprises logic means responsive to said pressure and temperature signals and communicating with said storage means for providing an output signal indicative of one or more conditions of said liquid storage and dispensing system.

* * * * *